Figure 1:
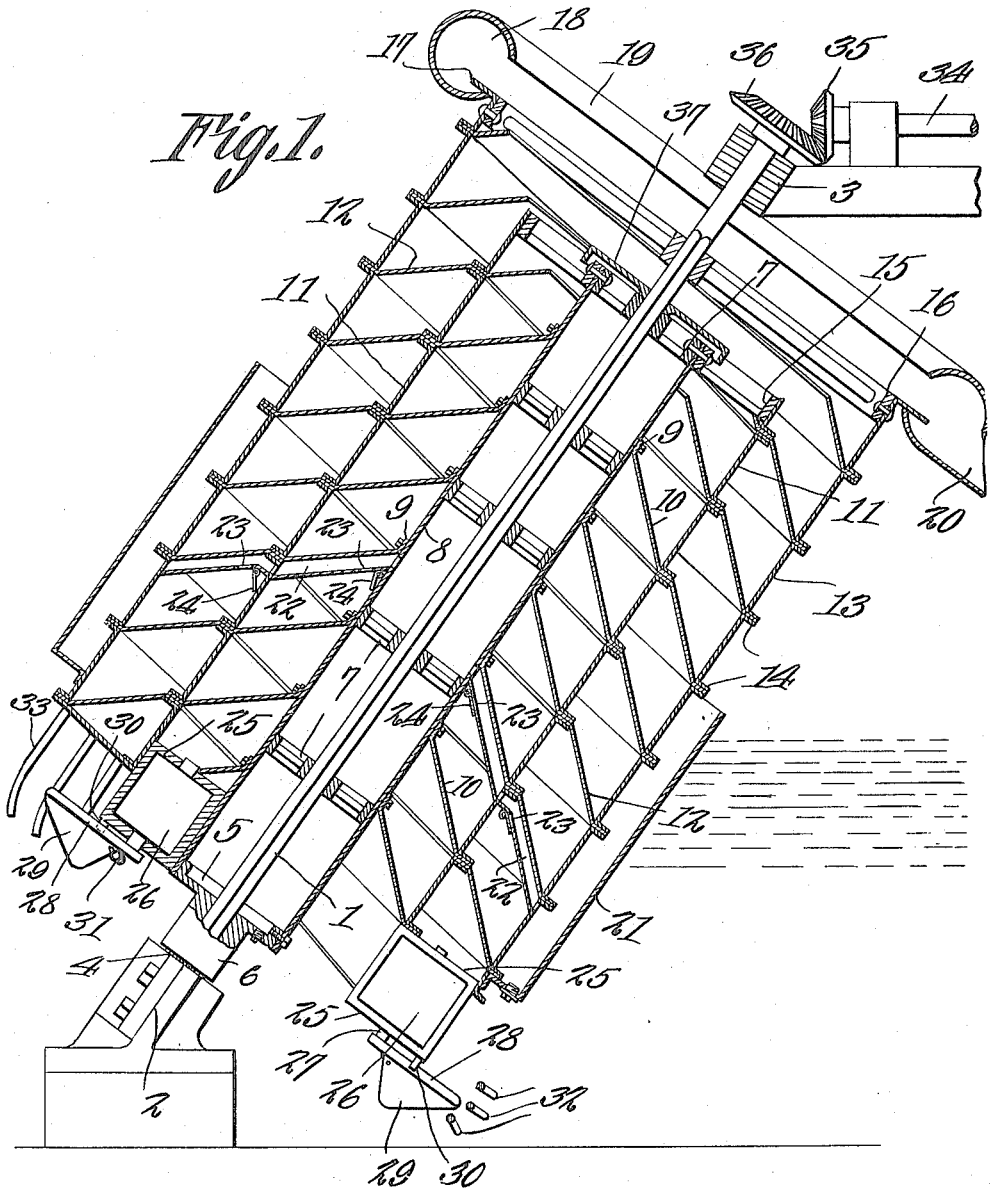

C. J. JONES.
WATER ELEVATOR.
APPLICATION FILED MAR. 24, 1915.

1,196,696.

Patented Aug. 29, 1916.
2 SHEETS—SHEET 1.

Witnesses

Charles J. Jones
Inventor,
by C. A. Snow & Co.
Attorneys.

C. J. JONES.
WATER ELEVATOR.
APPLICATION FILED MAR. 24, 1915.
1,196,696.
Patented Aug. 29, 1916.
2 SHEETS—SHEET 2.
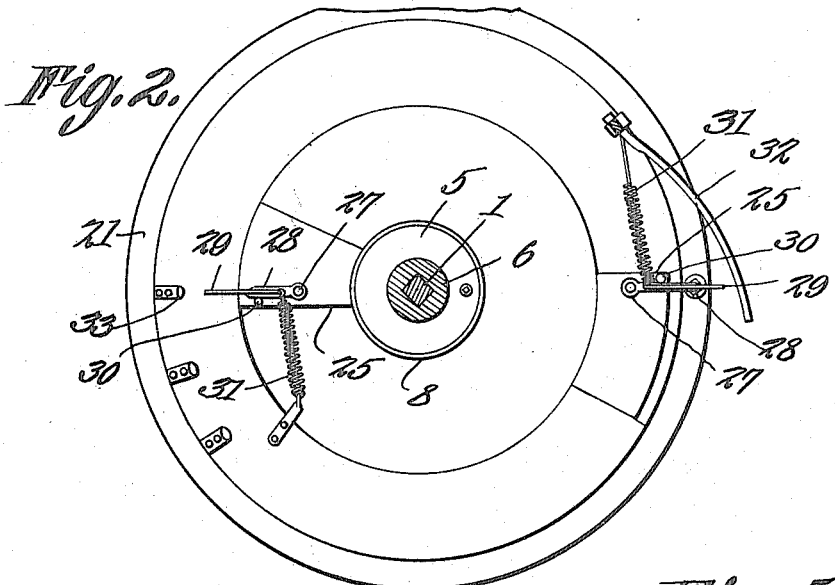
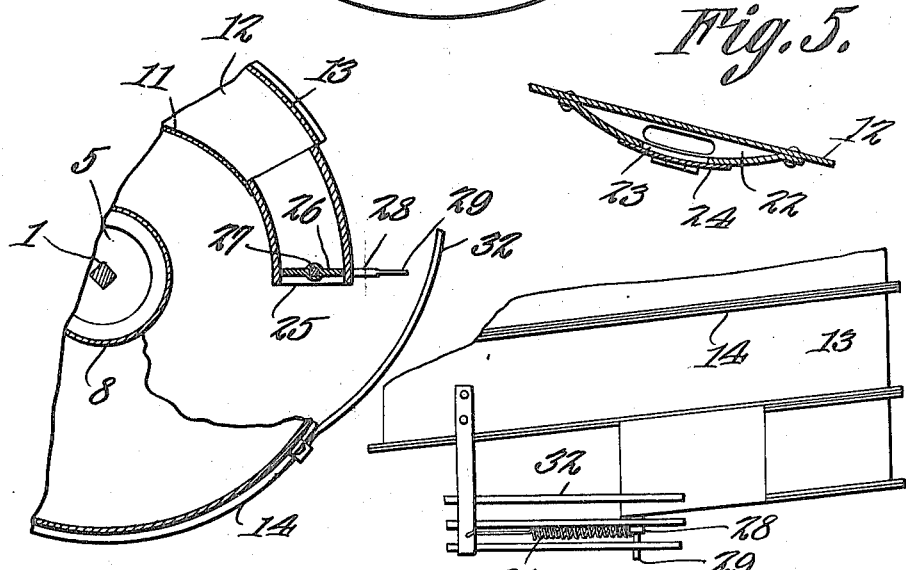
Witnesses
Charles J. Jones
Inventor,
by
Attorneys.

UNITED STATES PATENT OFFICE.

CHARLES J. JONES, OF PORTALLES, NEW MEXICO.

WATER-ELEVATOR.

1,196,696.   Specification of Letters Patent.   Patented Aug. 29, 1916.

Application filed March 24, 1915. Serial No. 16,727.

*To all whom it may concern:*

Be it known that I, CHARLES J. JONES, a citizen of the United States, residing at Portalles, in the county of Roosevelt and State of New Mexico, have invented a new and useful Water-Elevator, of which the following is a specification.

This invention relates to water elevators of that type utilizing what is commonly known as an Archimedean screw.

One of the objects of the invention is to greatly increase the capacity of the elevator and at the same time hold as much water as possible above the axis of the elevator whereby the elevator is brought more nearly to an even balance, this result being attained by utilizing concentrically arranged screws working together as one body.

A further object is to provide means for supplying air under atmospheric pressure to the spaces between the convolutions of the screws and above the bodies of water supported by the convolutions.

A further object is to provide valves for controlling the admission of water to the elevator, said valves having means whereby the water is allowed to enter the spaces between the convolutions of the screw only in a predetermined proportion to the speed of rotation of the elevator so that the dead weight to which the propelling mechanism of the elevator would be subjected when starting the screw while fully primed or charged, is eliminated and the apparatus always starts empty or practically empty and slowly fills as the speed of rotation of the screw increases, the volume of water entering the elevator, as before stated, being proportioned to the speed of rotation.

It is a well recognized fact that it requires much more power to start a wind or water motor when coupled to a load than is necessary after the start has once been made and it has been found where a wind motor or a water motor is used for propelling a water elevator such as constitutes the present invention, that unless the water elevator is practically empty each time a start is made, it is often impossible to obtain sufficient power to give the elevator the necessary initial start. Thus when a light wind is blowing the elevator would remain inactive because the load is too great whereas if the load had been light a wind could be used to lifting purposes.

As before pointed out, an object of the present invention is to provide means whereby the water elevator will be kept normally empty or substantially empty so that when the actuating motor is started, it will meet with but little resistance and, consequently, the elevator will be promptly and readily set in motion, the water to be elevated being gradually admitted thereto in a volume increasing in proportion to the speed of rotation of the elevator.

A further object is to provide means whereby surplus water contained within the elevator can be drained therefrom and distributed to other points so that the amount of water supported by all of the convolutions remains practically the same.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the accompanying drawings the preferred form of the invention has been shown.

In said drawings: Figure 1 is an enlarged vertical section through the water elevator. Fig. 2 is a bottom plan view of the elevator, the central part thereof being shown in section. Fig. 3 is a transverse section through a portion of the lower end of the elevator. Fig. 4 is a side elevation of the structure shown in Fig. 3. Fig. 5 is an enlarged transverse section through a portion of one of the convolutions of the elevator and through the air conduit thereunder.

Referring to the figures by characters of reference 1 designates a central shaft which may be solid or tubular and which, in the present instance is shown angular, although it is to be understood that it may be cylindrical if preferred. The shaft is provided at its ends with suitable bearings 2 and 3 and is inclined preferably at an angle of about 40 degrees. The bearing 2 at the lower end of the shaft is adapted to take up both end and side thrusts and is preferably provided with a suitable arrangement of anti-friction balls 4.

Secured to the shaft 1 so as to rotate therewith is a head 5 having a cylindrical extension 6 depending therefrom and which forms one member of the lower bearing of the elevator. To this shaft 1 are likewise secured spiders 7 the upper one of which constitutes the open upper head of the elevator. The head 5 and the spiders 7 fit snugly within and are secured to the tubular core 8 of the elevator, this core being concentric with the axis of the shaft 1. Secured to the outer face of the core 8 is an upstanding flange 9 formed along the inner edge of a spiral blade 10 extending around the core from the lower to the upper end thereof. The spaces between the convolutions of the screw thus formed are closed by a wall 11 concentric with the core 8 and which can be of any construction desired. Another spiral blade 12 is extended around the wall 11 and these convolutions constitute practically lateral extensions of the convolutions of blade 10. The blade 12 is housed within a cylindrical wall 13 concentric with wall 11 and core 8. It is to be understood, as before pointed out, that wall 11 and, likewise, wall 13, can be made in any manner desired. For example each wall can be formed of a single length of sheet metal wrapped spirally so as to fit between the convolutions of the blade, flanges 14 being formed along the upper and lower edges of the strips and bolted together and to the blades. This construction has been illustrated in the drawings.

The upper end of the wall 11 is secured to a ring 15 concentric with the upper spider 7 and which ring constitutes a reinforce. The upper end of the outer wall 13 is likewise reinforced by a ring 16 and this outer wall 13 has an annular flange 17 at its upper end which projects into a gutter 18. Said gutter is in the form of a ring extending around the upper portion of the elevator and said gutter has a continuous overhang or apron 19 whereby splashing is reduced to the minimum. The gutter occupies a plane approximately perpendicular to the shaft 1 and extending from the lowest portion of the gutter is an outlet spout 20 through which the elevated water is discharged.

The lowest portion of the upper edge of wall 13 and the lowest portion of the upper edge of wall 11 are preferably arranged so as to aline horizontally so that when water supported by the blades 10 and 12 reaches its highest level in the elevator, it will begin to drain laterally from both blades simultaneously and flow to the gutter 18.

A jacket 21 extends around and rotates with the lower portion of the elevator, this jacket being closed at the bottom but open at the top. Furthermore the jacket is designed to extend to a point above the level of the body of water in which the elevator is arranged.

Extending transversely of the blades 10 and 12 and within the upper portions of the spaces formed between the lower convolutions of the blades are air conduits or passages 22 open at their ends, the outer ends of these passages being in communication with the interior of the jacket 21, while the inner ends are in communication with the interior of the core 8. Ports 23 are formed in the walls of the passages and are provided with check valves 24 designed to open downwardly to admit air from the passages 22 into the spaces between the convolutions. These ports are positioned close to the inner edges of the blades 10 and 12, as shown.

Where two elevating screws are combined in one elevator, as in the construction illustrated, the two screws have their water inlets at diametrically opposed points in the bottom of the elevator. Each of these inlets, which has been indicated at 25 is normally closed by a gate valve 26 mounted to swing about a central axis parallel with the shaft 1 and which has been indicated at 27. An arm 28 extends radially from said axis and is provided with a fin 29. A stop lug 30 extends into the path of the arm 28 and serves to limit its movement in one direction. In other words when the valve is brought to closed position, the arm 28 comes against the stop 30. A spring 31 may be used for holding the arm against this stop, although it is to be understood that any other suitable means may be provided for holding the valve yieldingly in closed position. The fin 29 is supported beyond the periphery of the elevator and preferably works back of a series of guard fingers 32 extending from the periphery of the elevator and which fingers serve to prevent roots, leaves and other trash from working against the fin and into the inlet and thus interfering with the proper operation of the machine. It is to be understood that other fingers such as shown at 33, may be extended in various directions from the lower portion of the elevator for the purpose of keeping agitated any sand or other material which may tend to accumulate around the base of the elevator where the water is drawn.

The elevator herein described may be actuated by any suitable means such as a water motor, a wind mill, or the like. Power is transmitted to the elevator from a shaft 34 through gears 35 and 36 to the shaft 1.

A cap 37 is preferably supported above the upper end of the core 8 so as to prevent splashing water from falling into the core. This cap, however, is held spaced from the core so as to permit air to circulate freely into and out of the core.

In using the elevator the same is mounted with its lower end submerged but the level of the body of water in which it is mounted should not be above the lowest point of the upper edge of jacket 21. The elevator is normally empty or substantially so and the valves 26 are normally closed. When the elevator begins to rotate under the action of its propelling means, such as a wind mill or water motor, the valves 26 will remain practically closed so that no weight will be added to the elevator by reason of a supply of water being admitted through the inlets 25, until after the rotation has reached a predetermined speed, whereupon the resistance offered by the body of water through which the fins 29 are moving will be sufficient to overcome the resistance of the springs 31 with the result that the fins 29 and arms 28 will swing away from the stops 30 and the valves 26 will gradually open thus to admit a volume of water into the lower end of each of the elevating screws. The water thus admitted to the screws will travel upwardly within the casing, it being trapped in separate bodies upon the different convolutions, the spaces between said bodies being filled with air under atmospheric pressure which enters between the convolutions through the ports 23 when said ports reach their uppermost positions during the rotation of the elevator. These ports likewise constitute means for permitting drainage of surplus water from the different convolutions and for admitting water to other convolutions where a sufficient amount has not accumulated. In other words, by providing the passages 22 and the valved ports 23, an even distribution of water upon the various convolutions is maintained with the result that, as the bodies of water reach the highest point within the elevator, they will be discharged in unvarying volumes into the gutter 18 from which the water will discharge through the spout 20.

Although but two concentric elevating screws have been described and shown, it is to be understood that the number of screws employed can be carried out indefinitely, each addition bringing the machine closer to a perfect balance and reducing the power required to operate it, while at the same time increasing the volume of water elevated.

Each time the elevator is brought to a stop, the water contained therein will be free to leak downwardly from the elevator, through the small openings around the valves 26, the elevator slowly rotating backwardly during such escape. Violent rotation, such as would result should the water be allowed to escape unhindered, is thus prevented. Thus when the elevator is again to be started, it will operate as before, the valves 26 preventing the admission of water to the elevator until after a sufficient momentum has been imparted to the elevator, whereupon the resistance offered to the movement of the fins 29 through the water in which the elevator is partly submerged will be sufficient to open valves 26. Any water that may accumulate in the case can be removed by a siphon, worm or other means and drains can be provided in the case and in the jacket whereby the water can be let out to prevent freezing in cold weather.

It will be understood that a spiral elevator constructed in the peculiar manner disclosed can be used as an ordinary water wheel by placing it on its side in a moving body of water.

What is claimed is:—

1. A water elevator including concentric cylindrical casings, spiral blades within the respective casings and forming, with the casings, concentric screws, said screws being inclined, each of said screws having an inlet at its lower end and an outlet at its upper end, and means for supplying air under atmospheric pressure to the spaces between the convolutions of the respective screws.

2. A water elevator including inclined concentric cylinders, spiral blades interposed between the cylinders and forming, with said cylinders, concentric screws having inlets at their lower ends and outlets at their upper ends, a jacket surrounding and revoluble with the outer cylinder adjacent the lower end thereof, and air passages for maintaining communication between the inner cylinder and the interior of the jacket, said passages having ports opening into the spaces between the convolutions of the respective screws.

3. A water elevator including inclined concentric cylinders, spiral blades interposed between the cylinders and forming, with said cylinders, concentric screws having inlets at their lower ends and outlets at their upper ends, a jacket surrounding and revoluble with the outer cylinder adjacent the lower end thereof, air passages for maintaining communication between the inner cylinder and the interior of the jacket, said passages having ports opening into the spaces between the convolutions of the respective screws, and valves for closing the ports.

4. An inclined cylindrical casing, a spiral blade therein and revoluble therewith and forming a spiral passage having an inlet at its lower end, a jacket extending around the casing above the inlet and closed at its lower end, there being passages opening from the interior of the jacket to the uppermost portions of the lower convolutions of the spiral passage.

5. A water elevator including a screw, a valve normally closing the inlet, and means operative by the resistance of the water in which the elevator is operating, for opening the valve.

6. A water elevator including a screw, a valve normally closing the inlet thereof, and means controlled by the speed of rotation of the elevator for opening the valve.

7. A water elevator including a screw, a valve at the inlet end thereof, yielding means for holding the valve normally closed, and means operated by the resistance of the body of water in which the elevator is working, for opening the valve when the elevator reaches a predetermined speed of rotation.

In testimony that I claim the foregoing as my own, I have hereto affixed my signature in the presence of two witnesses.

CHARLES J. JONES.

Witnesses:
R. M. PARKER,
HERBERT D. LAWSON.

Copies of this patent may be obtained for five cents each, by addressing the "Commissioner of Patents, Washington, D. C."